(12) United States Patent
Kamiya

(10) Patent No.: US 12,105,790 B2
(45) Date of Patent: Oct. 1, 2024

(54) INFORMATION PROCESSING APPARATUS, METHOD, AND PROGRAM STORAGE MEDIUM

(71) Applicant: Canon Kabushiki Kaisha, Tokyo (JP)

(72) Inventor: Yuka Kamiya, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 299 days.

(21) Appl. No.: 17/671,920

(22) Filed: Feb. 15, 2022

(65) Prior Publication Data

US 2022/0261472 A1 Aug. 18, 2022

(30) Foreign Application Priority Data

Feb. 16, 2021 (JP) .................................. 2021-022922

(51) Int. Cl.
  *G06F 21/44* (2013.01)
  *G06F 3/12* (2006.01)
  *G06F 8/61* (2018.01)
  *G06F 9/445* (2018.01)

(52) U.S. Cl.
  CPC ............ *G06F 21/44* (2013.01); *G06F 3/1203* (2013.01); *G06F 3/1229* (2013.01); *G06F 8/61* (2013.01); *G06F 9/44505* (2013.01)

(58) Field of Classification Search
  None
  See application file for complete search history.

(56) References Cited

U.S. PATENT DOCUMENTS

| | | |
|---|---|---|
| 11,245,696 B2 | 2/2022 | Kurahashi |
| 2015/0358392 A1* | 12/2015 | Ramalingam ......... H04L 67/131 709/203 |
| 2019/0068708 A1* | 2/2019 | Rachabathuni ....... G06F 3/0659 |
| 2020/0195640 A1 | 6/2020 | Kurahashi |
| 2021/0006992 A1* | 1/2021 | Keaton ................ H04W 24/08 |
| 2021/0092241 A1* | 3/2021 | Yoshida ............. H04N 1/00344 |
| 2021/0377033 A1* | 12/2021 | Teran Guajardo .... H04L 9/3236 |
| 2023/0273782 A1* | 8/2023 | Chen ..................... H04L 67/125 709/225 |

FOREIGN PATENT DOCUMENTS

JP 2020-095569 A 6/2020

* cited by examiner

*Primary Examiner* — Helen Zong
(74) *Attorney, Agent, or Firm* — Venable LLP

(57) ABSTRACT

An information processing apparatus is provided with a receiving section configured so as to receive the selection of a service to be used and the settings related to a second application corresponding to the service that has been selected; a control section configured to control the execution of process including the installation of the second application and the application of the received settings in parallel with a device registration processing, without waiting to record the results of the device registration processing for the information processing apparatus by the first application; and a communication control section configured so as to execute a communication test in the case in which the results of the device registration processing is successful.

8 Claims, 11 Drawing Sheets

INFORMATION PROCESSING APPARATUS, METHOD, AND PROGRAM STORAGE MEDIUM

BACKGROUND OF THE INVENTION

Field of the Invention

The present invention relates to an information processing apparatus, a method, and a program storage medium.

Description of Related Art

Traditionally, in order to lighten the workload when registering a network device to a cloud server, a method of using a registration key has been proposed (for example, refer to Japanese Unexamined Patent Application, First Publication No. 2020-95569).

However, the method of Japanese Unexamined Patent Application, First Publication No. 2020-95569 does not take the work that is required for the use of each type of cloud service, for example, the installation and settings of a client application, into consideration. Due to this, there is a demand for further improvement with respect to lightening the workload and decreasing the work time until each type of cloud service is usable from the network device.

SUMMARY OF THE INVENTION

One embodiment of the present invention is an information processing apparatus that is configured so as to execute a first application and a second application. The information processing apparatus comprising: a memory storing instructions; and a processor executing instructions causing the information processing apparatus to: receive the selection of a service to be used and the settings related to the second application corresponding to the service that has been selected; control the execution of processing including the installation of the second application and the application of the received settings in parallel with device registration processing, without waiting to record the results of the device registration processing for the information processing apparatus by the first application; and execute a communication test in the case in which the results of the device registration processing is successful.

Further features of the present invention will become apparent from the following description of exemplary embodiments with reference to the attached drawings.

DETAILED DESCRIPTION OF THE INVENTION

Below, modes for implementing the present invention will be explained with reference to the figures and the like. However, the present invention does not necessarily require all of the features that are explained in the embodiments below.

Figure 1:
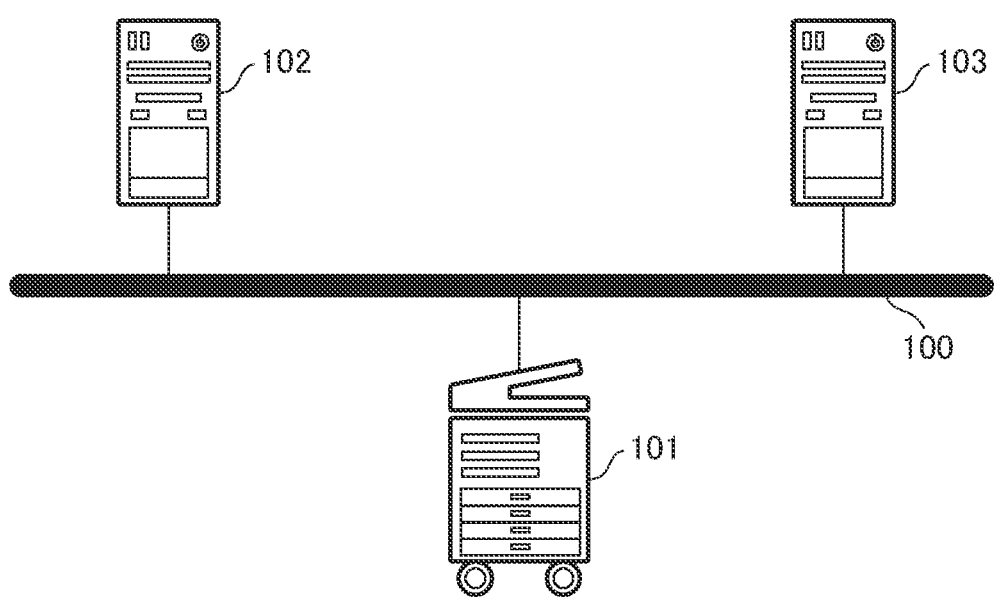
FIG. 1 is a diagram showing an example of a configuration of a support system of the present embodiment.

FIG. 1 is a diagram showing an example of a configuration of a cloud service connection support system of the present embodiment (also referred to below as a "support system").

The support system includes an image forming apparatus 101, a cloud server 102, and an application management server 103. FIG. 1 shows an example in which the support system includes one image forming apparatus 101. However, the support system may also include a plurality of image forming apparatuses 101.

The image forming apparatus 101 is mutually connected to the cloud server 102 and the application management server 103 via a network 100. The network 100 is, for example, a known communications network such as the internet or the like, and may use any configuration such as a LAN, a WAN, a telephone communication circuit, a wireless communication circuit, or the like, if data can be sent and received.

The image forming apparatus 101 is an information processing apparatus that is provided with a cloud service. The image forming apparatus 101 includes a printer, a copying machine, a digital multifunction peripheral, a 3D printer, or the like. However, in the present embodiment, a case will be explained in which the image forming apparatus 101 is a digital multifunction peripheral provided with each type of function such as a copier, a scanner, a printer, a fax machine, file transmission, and the like.

The image forming apparatus 101 is registered in a tenant that is managed by the cloud server 102 by sending a registration request to the cloud server 102. The image forming apparatus 101 that has been registered in the tenant is able to acquire access permission information for access to the cloud server 102. In addition, the image forming apparatus 101 downloads and installs a client application from the application management server 103. In this context, the client application (also referred to below as the "client") is an application that is required for each type of cloud service provided by the cloud server 102.

The cloud server 102 is a server for providing a device management service that manages the image forming apparatus 101, and each type of cloud service. The cloud server 102 provides the above-described device management service in a logically separate manner for each tenant, and provides each type of service licensed for each tenant.

The application management server 103 is a server that accumulates and manages the above-described client applications. The application management server 103 sends specific applications and the licensing information therefor according to requests from the image forming apparatus 101.

Figure 2:
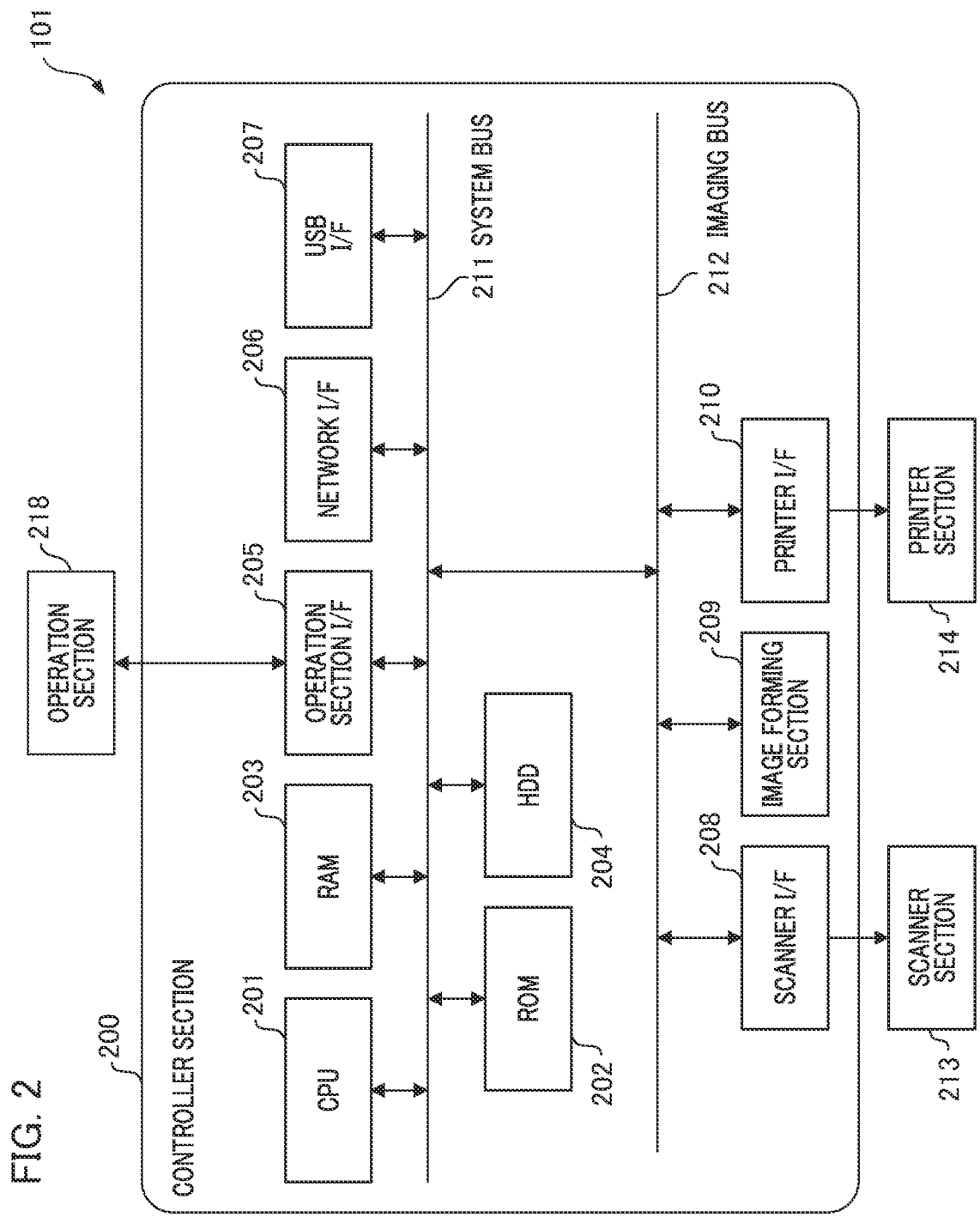
FIG. 2 is a diagram showing an example of a configuration of hardware of an image forming apparatus.

FIG. 2 is a diagram showing an example of a configuration of the hardware of the image forming apparatus 101. The image forming apparatus 101 is provided with a controller section 200, a scanner section 213, a printer section 214, and an operation section 218.

The controller section 200 is electrically connected to the scanner section 213, the printer section 214, and the operation section 218, and is connected to an external device via the network 100. The image forming apparatus 101 is thereby able to input and output image data and device information.

In this context, the scanner section 213 reads the original image on a sheet, and outputs the image data that was obtained by reading the original by performing image processing. The printer section 214 performs printing by forming an image on a printing sheet using toner based on the image data. The operation section 218 is configured as, for example, an input-output device in which a touch panel has been stacked on a display section.

The controller section 200 has a CPU 201, a ROM 202, a RAM 203, an HDD 204, an operation section I/F 205, a network I/F 206, and a USB I/F 207. These elements are connected to one another via a system bus 211. In addition, the system bus 211 is also connected to an image bus 212. The image bus 212 is connected to each of a scanner I/F 208, an image forming section 209, and a printer I/F 210.

Note that CPU is an abbreviation of Central Processing Unit, and ROM is an abbreviation of Read Only Memory. RAM is an abbreviation of Random Access Memory, and HDD is an abbreviation of Hard Disk Drive. USB is an abbreviation of Universal Serial Bus.

The CPU 201 is a processer that performs each type of calculation processing according to a program that has been stored on the ROM 202 or the RAM 203. The ROM 202 is a nonvolatile storage area, and for example, has a program stored on it such as BIOS or the like. The RAM 203 is used as a temporary storage area (a work memory) for when the CPU 201 performs each type of calculation processing. The RAM 203 is configured by an FRAM (registered trademark) and an SRAM that are able to retain their stored contents even after the power has been turn off, as well as a DRAM that deletes all of its stored content after the power has been turn off.

The HDD 204 is a nonvolatile mass storage medium that stores system applications and the like. In addition, the HDD 204 also stores firmware programs including the first application to be described below. The above-described firmware program is stored at the time of shipping from the factory of the image forming apparatus 101, and is a software group that is provided by being incorporated into the image forming apparatus 101. Note that a Solid State Drive (SSD) may also be used instead of the HDD 204.

The operation section I/F 205 connects the system bus 211 and the operation section 218, and is an interface that receives input from the operation section 218. For example, the operation section I/F 205 outputs the input information from the operation section 218 to the system bus 211, along with displaying operation screen data that has been received from the system bus 211 on the display section of the operation section 218. In this way, user commands related to the image forming apparatus 101 and the presentation of information from the image forming apparatus 101 is performed via the operation section 218.

The network I/F 206 connects the system bus 211 and the network 100, and is an interface for performing communication with an external device. The USB I/F 207 is a generic interface that connects each peripheral device to the image forming apparatus 101 by a control based on a USB standard.

The scanner I/F 208 is an interface that is connected to the scanner section 213, and performs corrections, processing, and editing on the image data that has been received from the scanner section 213. The image forming section 209 performs, for example, processing such as changing the orientation of the image data, compressing and expanding the image data, and the like. The printer I/F 210 is an interface that is connected to the printer section 214, receives the image data that has been sent from the image forming section 209, and then executes printing using the printer section 214.

Figure 3:
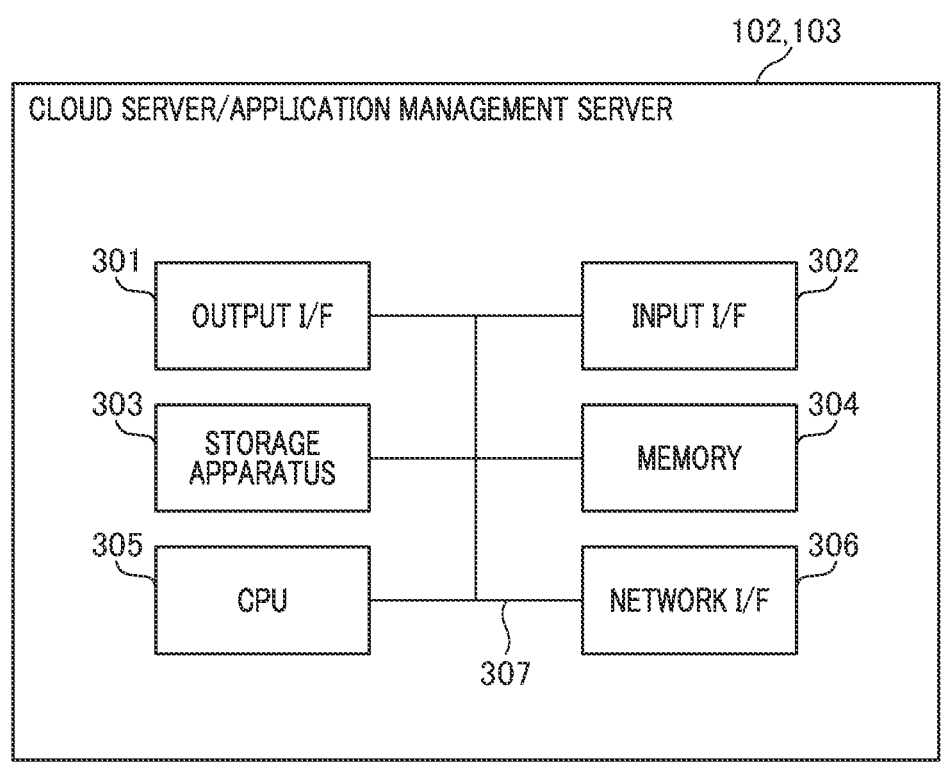
FIG. 3 is a diagram showing an example of a configuration of hardware of a cloud server.

FIG. 3 is a diagram showing an example of a configuration of the hardware of the cloud server 102. The cloud server 102 has an output I/F 301, an input I/F 302, a storage apparatus 303, a memory 304, a CPU 305, and a network I/F 306. These elements are connected to one another via a bus 307.

The output I/F 301 is connected to an output apparatus, which is not shown, and is an interface that is responsible for the output to the output device. The output device is, for example, a display apparatus such a liquid crystal display or the like.

The input I/F 302 is connected to an input apparatus, which is not shown, and is an interface that receives the input from the input apparatus. The input apparatus may be, for example, a keyboard, a pointing device, or the like.

The storage apparatus 303 stores, for example, an OS (Operating System), programs such as an authentication program and a management program or the like, and each type of information. In this context, an authentication program is a program that performs authentication and connection progressing, and a management program is a program that registers and manages the image forming apparatus 101. In addition, the information that is stored on the storage apparatus 303 includes the registration information of the customer organization or the image forming apparatus 101, as well as the settings information and operation information that are received from the image forming apparatus 101, and the like.

The memory 304 is used as a temporary storage area (a work memory) when the CPU 305 performs each type of calculation processing.

The CPU 305 is a processor that performs each type of calculation processing according to a program. The CPU 305, for example, loads an authentication program and a management program onto the memory 304 from the storage apparatus 303, and executes these programs.

The network I/F 306 is an interface for performing communication with an external device. The network I/F 306 is connected to the network 100, and performs communication control with the image forming apparatus 101 via the network 100.

Note that FIG. 3 corresponds to a block diagram of the hardware of a typical information processing apparatus. Note that the hardware configuration of the application management server 103 is the same as that of FIG. 3, and a redundant description regarding the application management server 103 has therefore been omitted.

Figure 4:
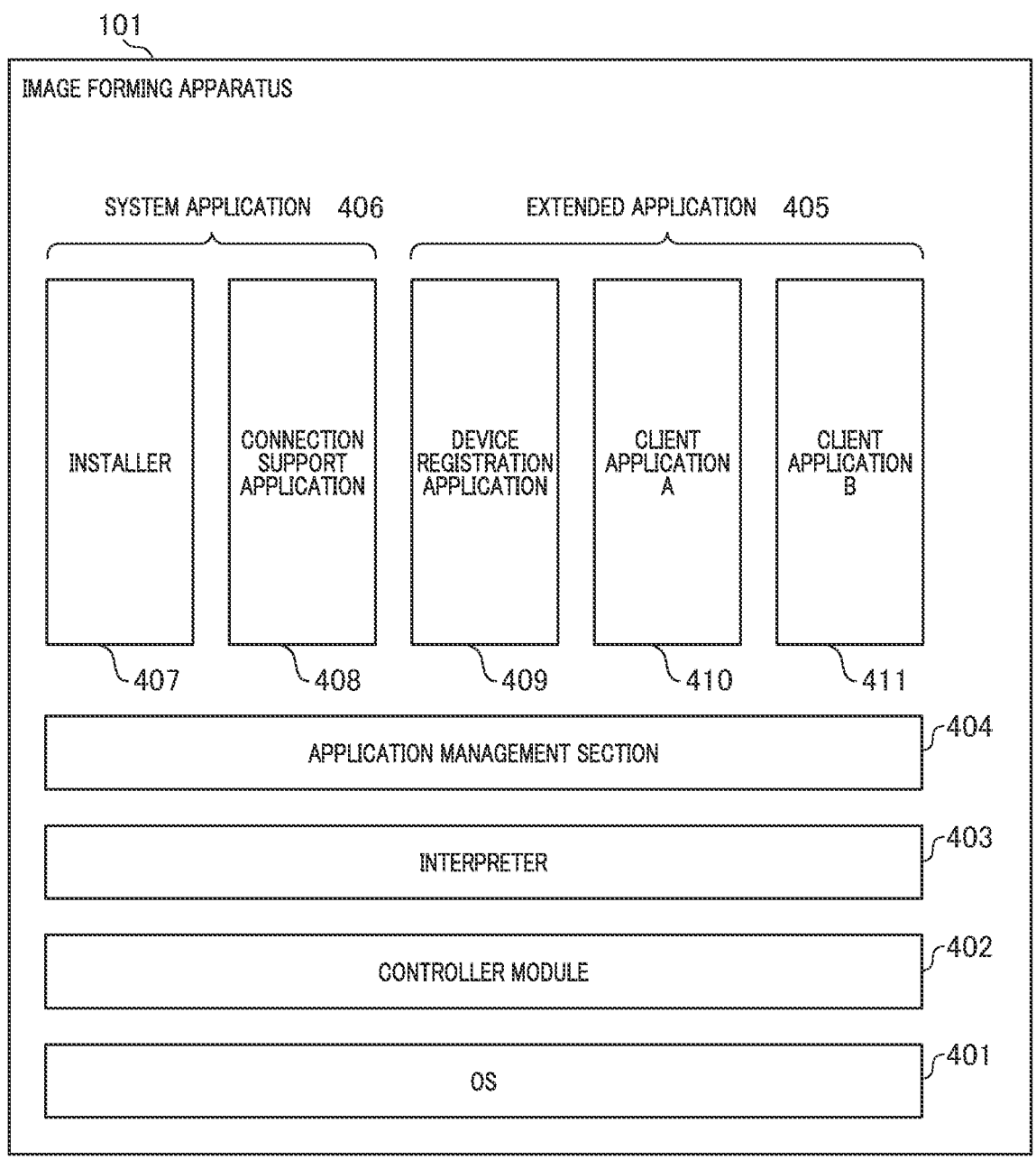
FIG. 4 is a diagram showing an example of a configuration of software of the image forming apparatus.

FIG. 4 is a diagram showing an example of a configuration of the software of the image forming apparatus 101. Each of the software that is shown in FIG. 4 is executed by the CPU 201. In addition, each type of information that is used during the execution of the software is retained on the RAM 203 or the HDD 204. This information is exchanged between the software functions. Furthermore, the network I/F 206 is used in communications with an external device by the software.

The image forming apparatus 101 has an OS 401, a controller module 402, an interpreter 403, an application management section 404, an extended application 405, and a system application 406 as software modules. In this context, the OS 401, the controller module 402, the interpreter 403, and the application operation section 404, are stored, for example, in the ROM 202, and the extended application 405 and the system application 406 are stored, for example, on the HDD 204.

The OS 401 provides basic control functions by integrally managing the image forming apparatus 101. The controller module 402 functions on the OS 401, and is responsible for controlling each type of device. The interpreter 403 is responsible for the functions that successively execute the programs such as each type of application. The application management section 404 functions on the interpreter 403, and is responsible for the functions that manage a plurality of application groups.

The extended application 405 operates under the management of the application management section 404, and is an application that realizes each type of function of the image forming apparatus 101. The extended application 405 includes a device registration application 409, a client A410 and a client B411 that correspond to each type of cloud service, and the like.

The system application 406 is an application that operates under the management of the application management section 404, and includes an installer 407 that controls the installation of the extended application 405, a connection support application 408, and the like. The system application 406 differs from the extended application 405, and is incorporated as a part of the firmware. Due to this, the system application 406 does not need a license, and the system application 406 cannot be updated in a form independent from the firmware.

The application management section 404 responds to the application installation command from the installer 407, and adds the application to be installed as a management target. The application management section 404 retains application information including the version of the application and the licensing information that have been added under the management, and the like. Furthermore, the application management section 404 removes the extended application 405 from the management targets in response to the deletion of the application program in the image forming apparatus 101.

Note that the device registration application 409 and the license file thereof are packaged together with the firmware in advance, and are automatically installed by the installer 407 the first time that the image forming apparatus 101 is started, and when it is restarted after a firmware update. The above-described device registration application 409 and the license file installation conditions will also be referred to below as "preinstall".

Figure 5:
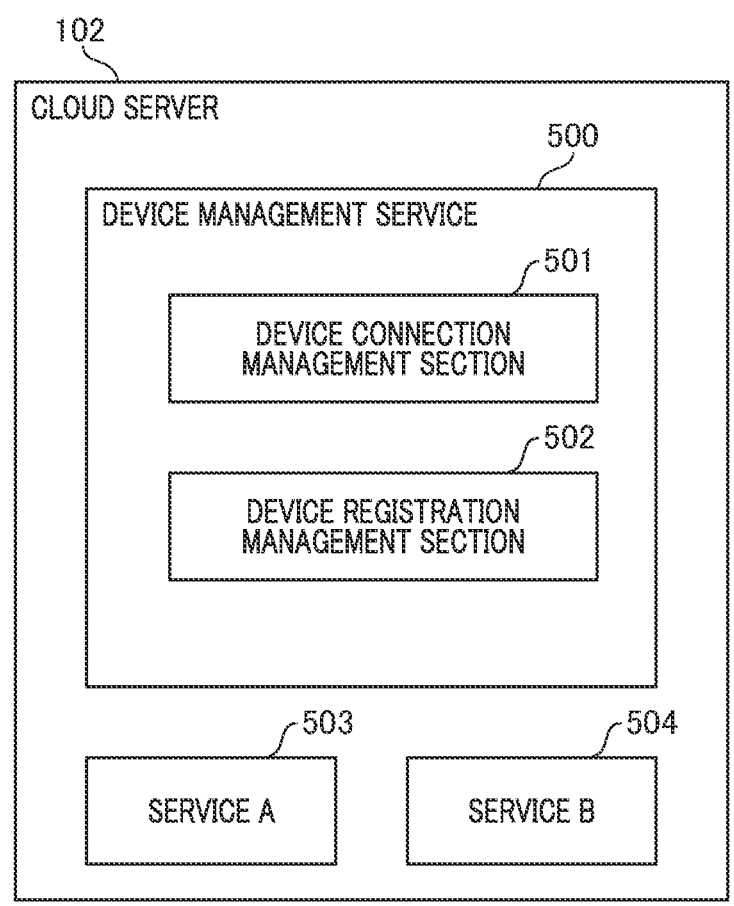
FIG. 5 is a diagram showing an example of a configuration of software of the cloud server.

FIG. 5 is a diagram showing an example of a configuration of the software of the cloud server 102. FIG. 5 shows, from among the software that operates on the cloud server 102, the software that is related to the principal units of each type of service and the device management service.

The cloud server 102 has a device management service 500, a service A503, and a service B504 as software modules. The cloud server 102 is able to provide various services including the device management service 500 by these software.

The data from the image forming apparatus 101 is managed by the device management service 500 of the cloud server 102 in a logically separated state for each client organization and sales organization. Due to this, the "tenants", which are virtual organizations, are created at the unit of a customer organization or a sales organization in the device management service 500, and a tenant is assigned to the customer organization or sales organization. In addition, the device management service 500 is able to separate and manage the data from the image forming apparatus 101 at the unit of a tenant by registering the image forming apparatus 101 in the tenant that has been assigned to the customer organization or sales organization. Furthermore, by granting the license for the cloud service that operates on the cloud server 102 to a tenant, the image forming apparatus 101 that belongs to the tenant is able to use the cloud services for which the tenant has been granted a license.

A device connection management section 501 performs management of the identification information that identifies the image forming apparatus 101, and generates a device registration key. The device registration key is a key for uniquely specifying a tenant, and is used in order to register the image forming apparatus 101 to a designated tenant.

A device registration management section 502 registers the image forming apparatus 101 to a tenant in response to a device registration request that has been sent from the image forming apparatus 101. The device registration management section 502 associates and manages the device registration key and the device identification information (for example, the serial number or the like of the image forming apparatus) that are included in the device registration request, and the tenant ID that identifies the tenant to be registered.

Figure 6:
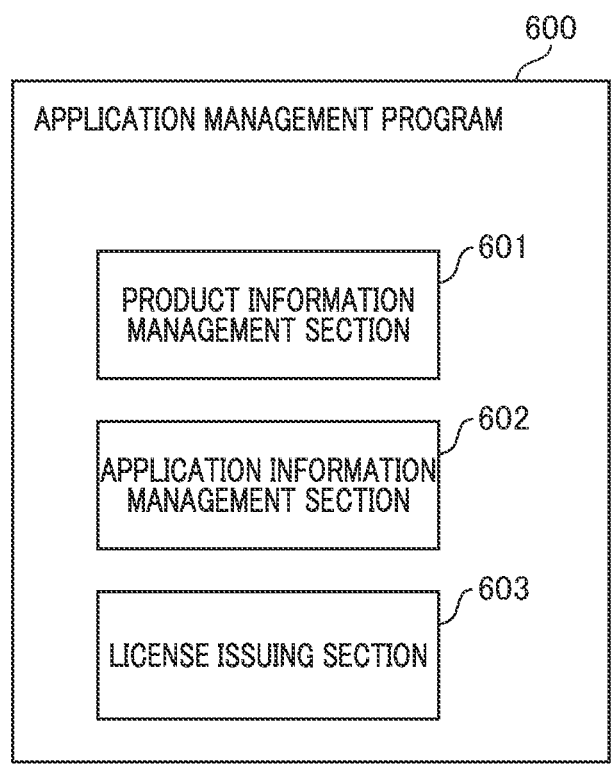
FIG. 6 is a diagram showing an example of a configuration of software of an application management server.

FIG. 6 is a diagram showing an example of a configuration of the software of the application management server 103. FIG. 6 shows, from among the software that operates on the application management server 103, the software that is related to the principal units of the application management program 600.

The application management program 600 includes a product information management section 601, an application information management section 602, and a license issuing section 603.

The product information management section 601 retains and manages a product information table. In this context, the product is a unit by which the application files are sold, and customers purchase the application files by the product unit. The product information table links the product ID and product name for identifying the product, the application ID of the application that is included in the product, the license access number that is required in order to issue a license for the product, and the like.

The application information management section 602 retains and manages an application information table. The application information table links the application ID and application name for specifying the application, as well as the address that indicates the acquisition source of the application file.

The license issuing section 603 issues a license based on the license access number that has been specified. The license issuing section 603 issues a license based on, for example, the license access number that is sent from the image forming apparatus 101, and sends the license file and application file to the image forming apparatus 101.

Figure 7:
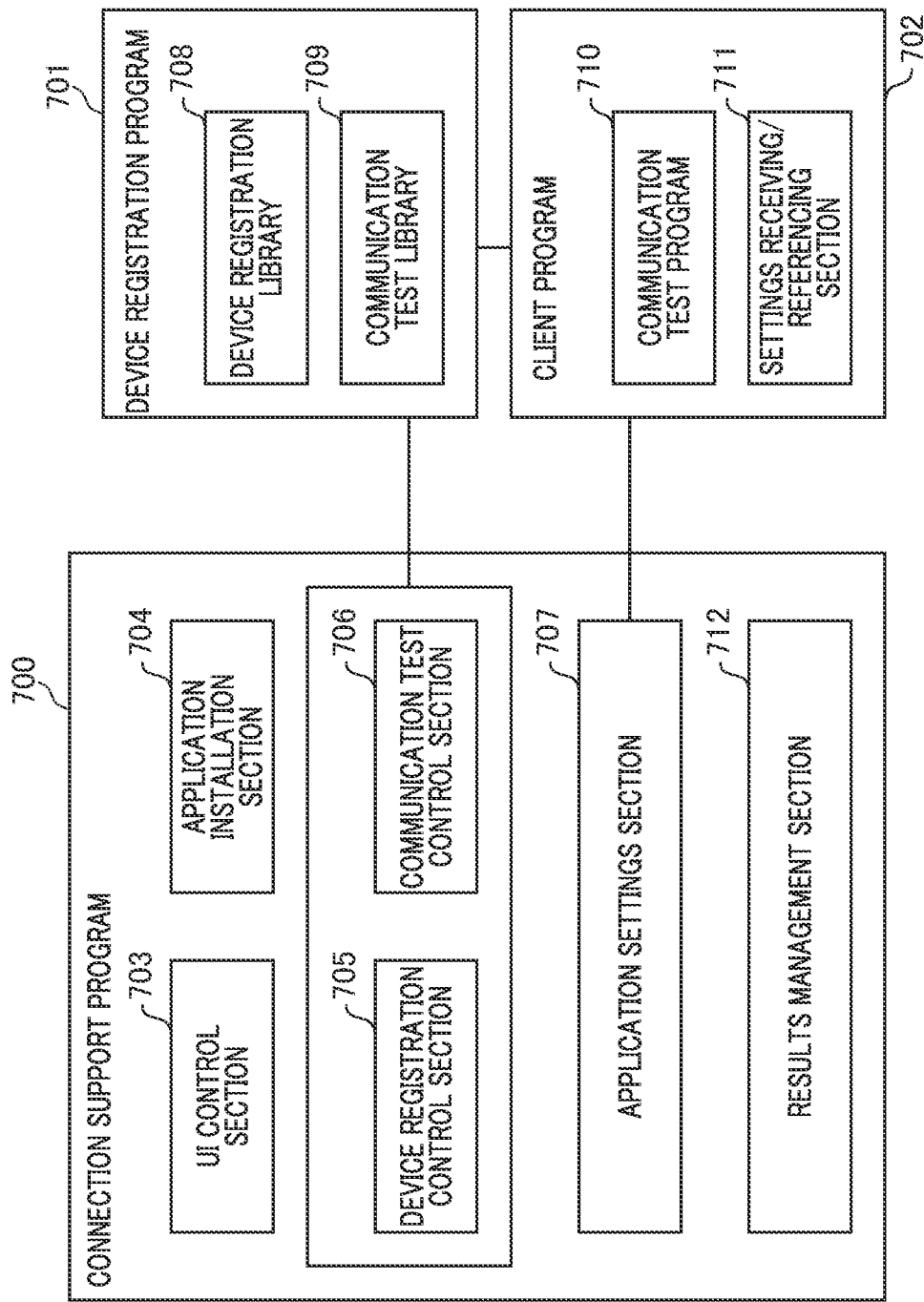
FIG. 7 is a diagram showing the principal units of an application that operates on the image forming apparatus.

FIG. 7 is a diagram showing the principal units of an application that is operated on the image forming apparatus. The application in FIG. 7 includes a connection support program 700, a device registration program 701, and a client program 702.

The connection support program 700 is a program that operates as the connection support application 408 that was shown in FIG. 4. The connection support program 700 includes a UI control section 703, an application installation section 704, a device registration control section 705, a communication test control section 706, an application settings section 707, and a results management section 712.

The UI control section 703 is one example of a receiving section, and is responsible for a function that receives the user input necessary for executing each function of the connection support program 700, and a function that forms the control screen for receiving the input. In addition, the application installation section 704 is one example of a control section and the communication test control section 706 is one example of a communication control section.

The device registration program 701 is a program that operates as the device registration application 409 that was shown in FIG. 4. The device registration program 701 includes a device registration library 708 and a communication test library 709. Note that the device registration program 701 is configured by an API group that executes processing by being called by the device registration control section 705 and the communication test control section 706.

The client program 702 is installed so that the image forming device 101 can be provided with the cloud service and is a program that operates as the client A410 and the client B410 that are shown in FIG. 4. The client program 702 includes a communication test section 710 and a settings receiving/referencing section 711.

Figure 8:
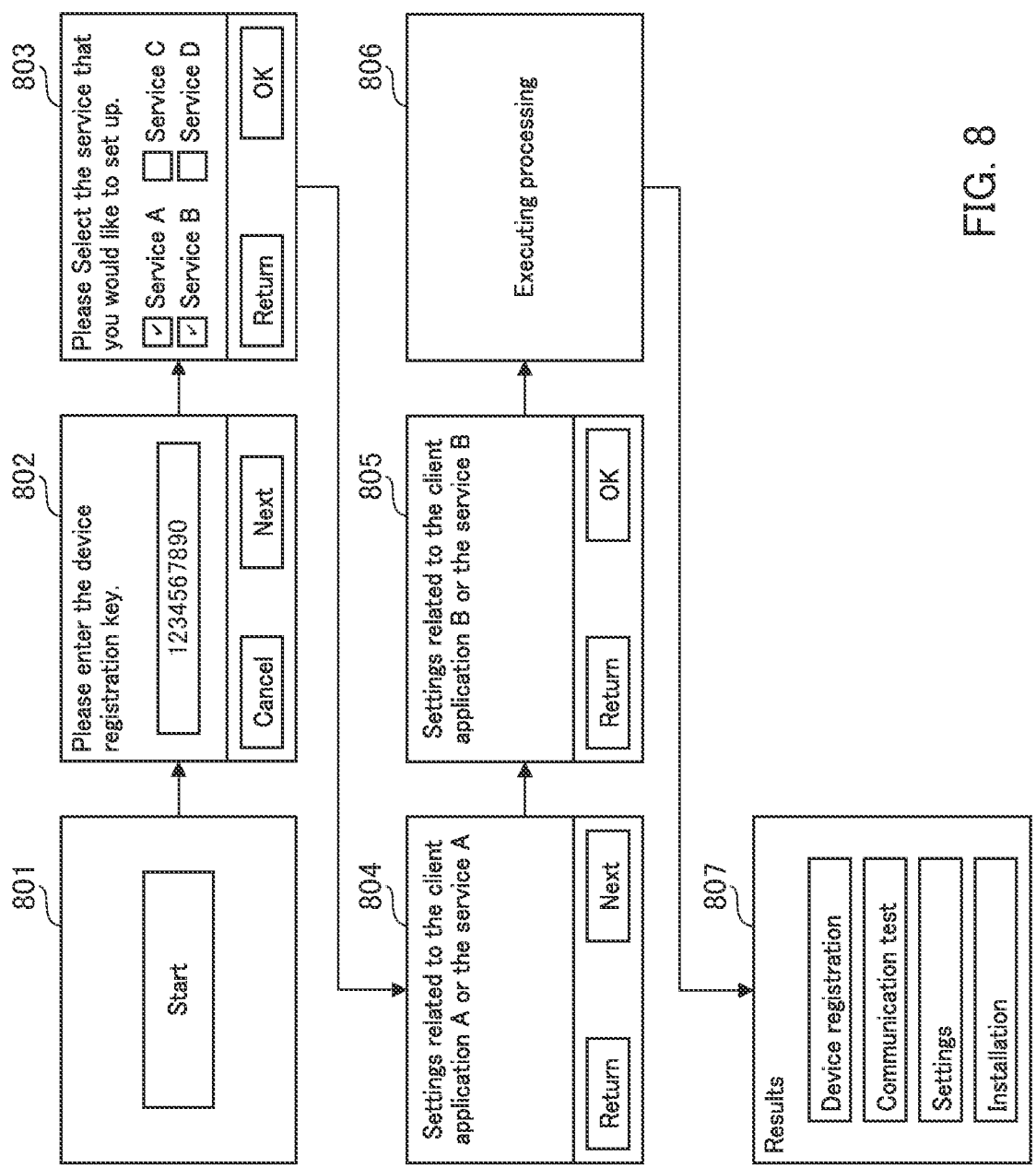
FIG. 8 is a diagram showing an example of a transition of an operation screen that is displayed on the image forming apparatus.

FIG. 8 is a diagram showing an example of a transition of an operation screen that is displayed on the image forming apparatus 101. Each operation screen in FIG. 8 is displayed on the operation section 218.

A start screen 801 is a screen that is displayed on the operation section 218 when a series of processes starts. The start screen 801 includes a start button that receives a processing start command.

The operation screen transitions when the start button is operated using the start screen 801. At that time, the operations screen that is displayed will differ based on whether or not the image forming apparatus 101 that is being operated has already been device registered in the device management service 500. The device registration control section 705 of the connection support program 700 is able to confirm whether or not the image forming apparatus 101 has been device registered by sending a query to the device management service 500 via the device registration library 708.

In the case in which the image forming apparatus 101 has not been device registered in the device management service 500, a device registration key input screen 802 will be displayed. In contrast, in the case in which the image forming apparatus 101 has been device registered in the device management service 500, a service selection screen 803 will be displayed.

The device registration key input screen 802 is a screen that receives the input of the device registration key that has already been issued in the device connection management section 501. The device registration key is used in order to manage the image forming apparatus 101 in the device management service 500, and for example, is required in order for the device registration library 708 to generate a registration request.

For example, the device registration key input screen 802 receives the manual input of the device registration key. However, it is also possible to have the device registration key stored in advance on the HDD 204 of the image forming apparatus 101. In that case, the processing may be made so that the connection support program 700 references the device registration key from the HDD 204, and the device registration key input screen 802 is displayed with the referenced value preset. Alternatively, the step of displaying the device registration key input screen 802 may be omitted.

For example, based on the destination of the image forming apparatus 101, a case is assumed in which the tenant to be registered can be fixed at one location. In this case, if the device registration key is preset on the firmware, it is also possible to omit the work of manually inputting the device registration key. This can contribute to reducing the workload of the user.

Next, when the operations on the device registration key input screen 802 are finished, and the "next" button is operated, the service selection screen 803 will be displayed.

The service selection screen 803 is a screen that receives the selection input for the applicable service in order to perform the client installation and settings corresponding to each type of cloud service (503, and 504). The example in FIG. 8 explains a case in which a service A and a service B have been selected using the service selection screen 803.

Next, when the "OK" button is operated using the service selection screen 803, setting screens 804 and 805 will be displayed in that order.

The setting screens 804 and 805 are screens that receive input for settings related to the service that was selected using the service selection screen 803, or the client that corresponds to the service. The connection support program 700 forms setting screens for only the number of services that have been selected using the service selection screen 803, and displays them on the operation section 218. In FIG. 8, the service A and the service B have been selected using the service selection screen 803, and therefore, the setting screen 804 corresponding to the service A, and the setting screen 805 corresponding to the service B are displayed.

All of the settings that are required in order to register the device and to use each type of cloud service are completed by the input until the above setting screen 805. That is, the user has completed all of the necessary work by pressing the "OK" button of the setting screen 805.

After this, the operation screen transitions to the executing screen 806, and the connection support program 700 executes the device registration processing, the client installation processing, the client setting processing, and the communication test processing. After the above processing has been completed, the operation screen will transition from the executing screen 806 to a menu screen 807.

The menu screen 807 includes a button that receives the operation to display the results of each of the processes. The user is able to confirm the execution results of each process as well as their current state by pressing each button of the menu screen 807.

Note that in the state in which the menu screen 807 is displayed, the connection support program 700 will also be updating the device registration application 409 and the clients (410, and 411) in the background.

Figure 9:
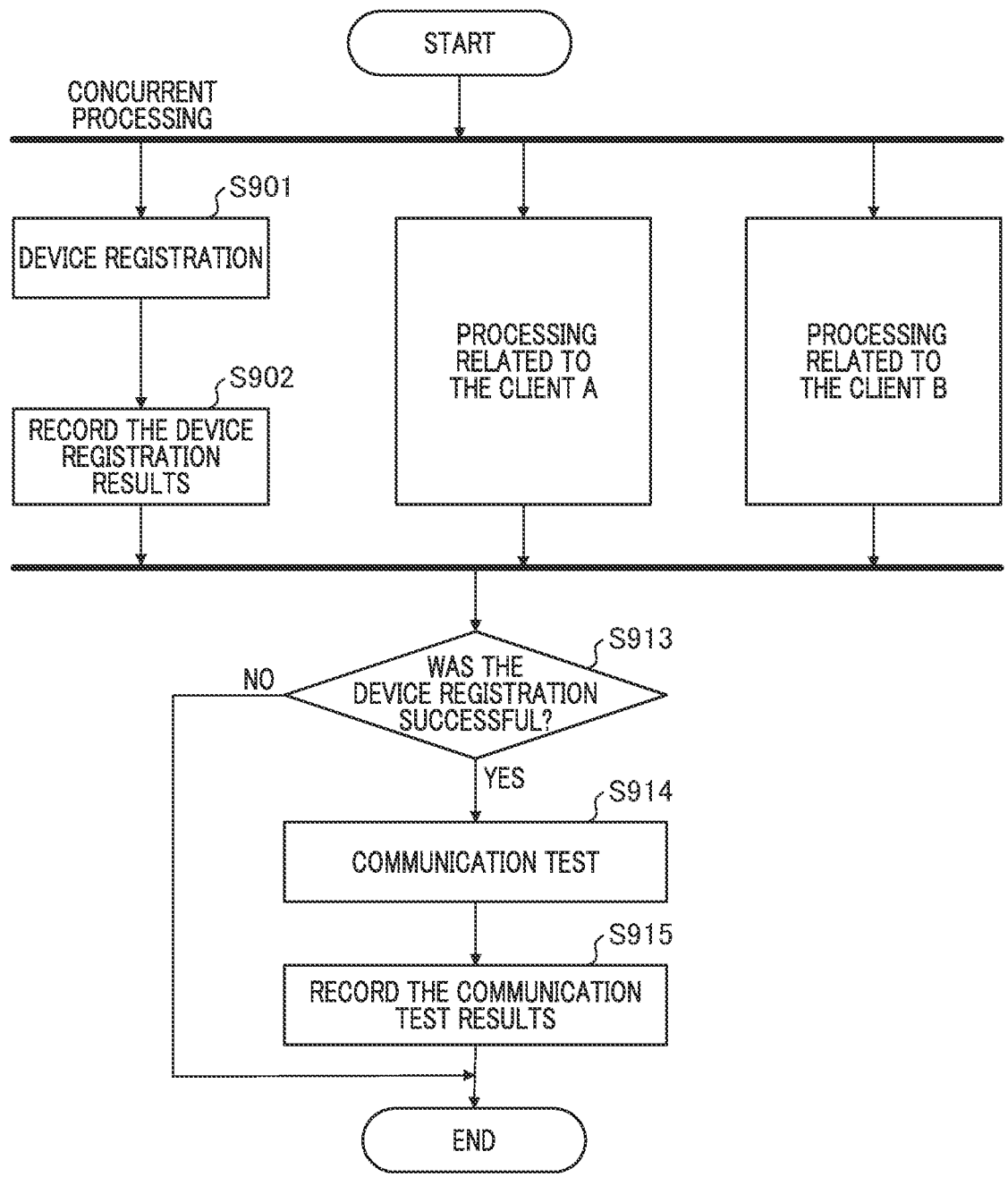
FIG. 9 is a diagram showing an example of cloud service connection processing by a connection support program.

FIG. 9 is a flow chart that shows an example of cloud service connection processing by the connection support program 700. The processing in FIG. 9 is executed while the executing screen 806 in FIG. 8 is displayed. In this context, the device registration application 409 is one example of the first application, and the client A410 and the client B411 are one example of the second application.

In FIG. 9, the connection support program 700 execute in parallels the device registration processing using the device registration application 409, which is the first application, and the processing related to each of the clients, which are the second application. At that time, the connection support program 700 executes each process related to the clients with all of the clients corresponding to the services that were selected using the service selection screen 803 as targets.

(Device Registration Processing)

First, the device registration processing will be explained with reference to S901 and S902.

In step S901, the connection support program 700 executes the device registration processing for the device management service 500 of the cloud server 102 via the device registration program 701.

Specifically, the device registration control section 705 delivers the device registration key that was received by the UI control section 703 to the device registration library 708. The device registration key is issued in advance by the device connection management section 501 of the device management service 500, and has been communicated to the user. However, as was explained in FIG. 8, the device registration key may refer to a value that has been saved in advance on the HDD 204, and is not limited to the input of the user.

The device registration library 708 generates a device registration request based on the device registration key, and sends this device registration request to the device management service 500. The device registration management section 502, which receives the device registration request, registers the image forming apparatus 101 to the tenant that matches the device registration key.

The device registration management section 502 notifies the device registration control section 705 of the device registration results via the device registration library 708. In the case that the device registration is successful, the device registration management section 502 also notifies the device registration control section 705 of the registered tenant information (the tenant ID, tenant name, and the like).

In step S902, the results management section 712 stores the device registration result about which notification was provided in step S901 in a file, and manages the current registration status, registered tenant information, and the like. The device registration processing is thereby completed.

(Processing Related to the Clients)

Figure 10:
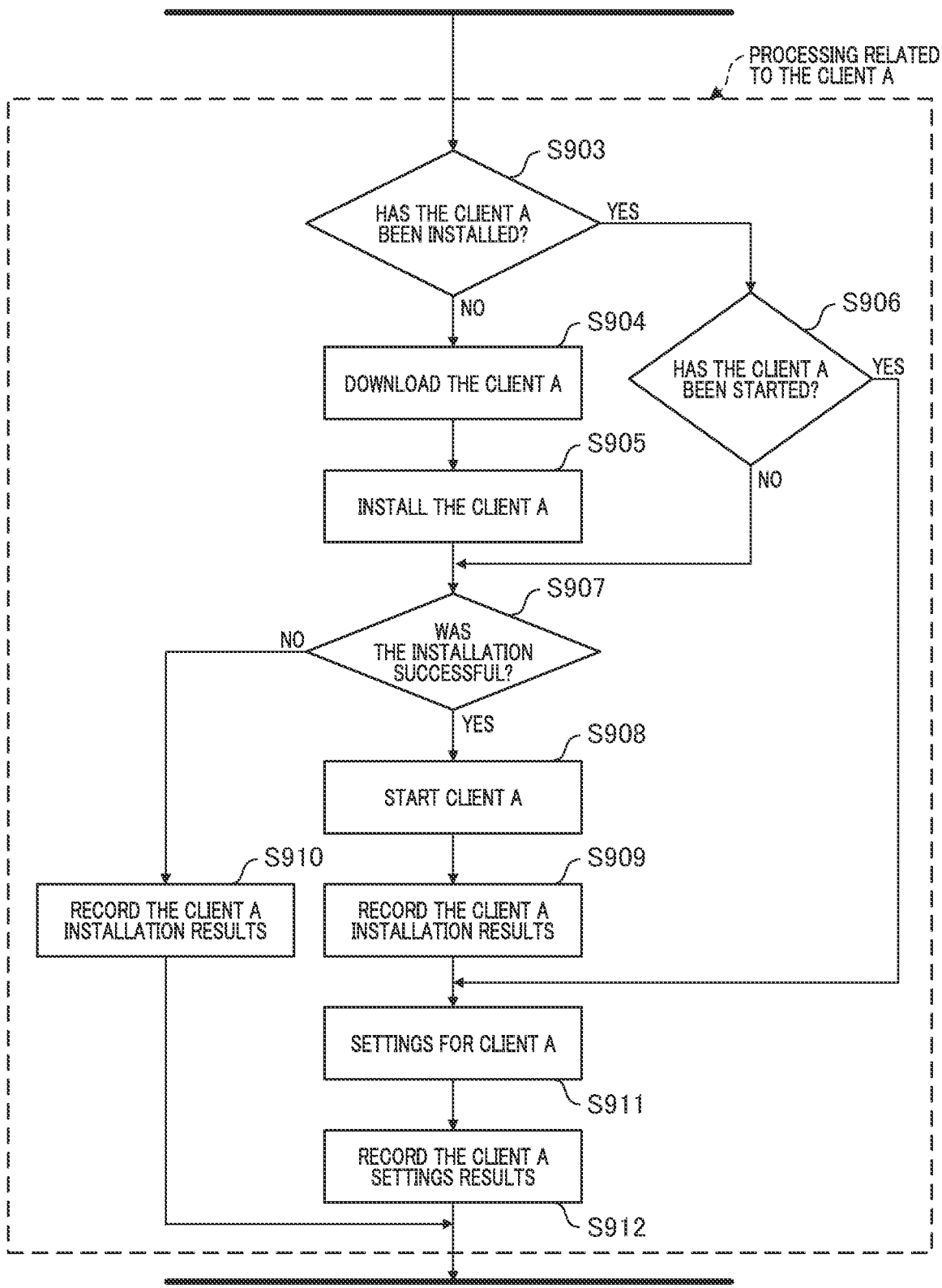
FIG. 10 is a diagram showing an example of processing related to the client in FIG. 9.

Next, the processing related to the clients will be explained with reference to FIG. 9 and FIG. 10. The processing related to the clients is executed in parallel by a service as the unit, and includes the client installation (S903 to S910), and the client settings (S911, and S912).

As is shown in FIG. 9, the processes related to the clients are, for example, executed in parallel targeting each of the clients A and B that correspond to the services A and B that were selected on the service screen 803. In addition, the processing related to the client A410 and the processing related to the client B411 are both identical. Therefore, the below description will explain the details of the processing related to the client A410 with reference to FIG. 10, and a redundant explanation of the processing related to the client B411 has been omitted.

(Client Installation)

In Step S903, the application installation section 704 sends a query to the application management section 404 and determines whether or not the client A410 has been installed. In the case that the client A410 has not yet been installed, the processing proceed to S904. In contrast, in the case in which the client A410 has already been installed, the processing proceed to S906.

In step S904, the application installation section 704 downloads the client A410 from the application management server 103.

Specifically, the application installation section 704 sends the license access number corresponding to the product that includes the client A410 to the application management server 103. The above license access number is the number that has been stored on the HDD 204 in advance.

The product is specified on the application management server 103 based on the license access number that was sent by the product information management section 601, and the application information management section 602 specifies the applications that are included in the product. Next, the license issuing section 603 generates the license files for applying the applications included in the specified product to the image forming apparatus 101. Subsequently, the application management server 103 sends the application file and the license file to the image forming apparatus 101.

In step S905, the application installation section 704 installs the application file and license file that have been downloaded via the installer 407. The client A410 is thereby able to be managed by the application management section 404. After that, the processing proceeds to S907.

In step S906, the application installation section 704 sends a query to the application management section 404 and determines whether or not the installed client A410 has been started. In the case in which the client A410 has been started, the processing proceeds to step S911. In contrast, in the case in which the client A410 has not been started, the processing proceeds to step S907.

In step S907, the application installation section 704 determines whether or not the installation of the client A410 was successful. In the case that the installation was successful, the processing proceeds to step S908. In contrast, in the case that the installation failed, the processing proceeds to step S910.

In step S908, the application installation section 704 starts the client A410 via the installer 407, and updates the management information of the application management section 404.

In step S909, the results management section 712 records the installation results (the installation's success) and the status of the client A410 (whether or not it has been started) in a file. In addition, the connection support program 700 manages the information for the application that has been installed and updated (the application ID, the application name, the version, the status, and the like). After this, the processing proceeds the step S911.

In step S910, the results management section 712 records the installation results of the client A410 (the installation's failure) in a file. In this case, the client settings to be explained below are not performed and the processing is completed.

(Client Settings)

In step S911, the application settings section 707 applies the contents of the settings related to the client A that were input using the setting screen 804 in FIG. 8 and were received by the UI control section 703. At this time, the application settings section 707 saves the above contents of the settings related to the client A on the HDD 204 via the settings reception/reference section 711 of the client A410. Note that if the location for the settings has been statically determined, the application settings section 707 may also save the settings directly to a designated location of the HDD 204 without going through the client A410.

In step S912, the results management section 712 records the settings results related to the client A in a file in association with the application information (the application name, version, and the like), as well as the service information (the service name and the like) and manages them.

The explanation of the processing related to the clients is thereby completed.

In addition, when the device registration processing and the processing related to the clients for all of the clients has been completed, the connection support program 700 will execute step S913.

In Step S913, the device registration control section 705 determines whether or not the device registration of step S901 was successful. In the case in which the device registration was successful, the processing proceeds to S914, and a communication test is executed. In contrast, in the case in which the device registration failed, the processing of FIG. 9 is completed.

(Communication Test)

In step S914, the communication test control section 706 executes a communication test for each client via the communication test library 709.

Specifically, when the communication test control section 706 calls the communication test library 709, the communication test library 709 sends out a request for a communication test for the communication test sections 710 of each client program. In the example in FIG. 9, the communication test library 709 sends out a communication test request for the client A410 and the client B411.

The communication test control section 710 of each client program 702 executes a designated conduction confirmation processing on the corresponding services. For example, in the case of the client A410, the communication test section 710 executes conduction confirmation processing on the service A503, and in the case of the client B411, the communication test section 710 executes conduction confirmation processing on the service B504. These conduction confirmation processes have been decided between each service/client, and may be a different type of processing for each service.

In addition, the communication test control section 706 is notified of the results of the communication test by the communication test sections 710 of each client program 702 via the communication test library 709.

In step S915, the results management section 712 records the results of the communication test for each client in a file and manages them. The device registration processing for the image forming apparatus 101, the installation and settings for each client, and the communication tests are completed by the above-described processing, and the image forming apparatus 101 becomes able to use each type of service. Above, the explanation of FIG. 9 and FIG. 10 is thereby completed.

In this context, the flow chart in FIG. 9 shows an example of processing in which it has been assumed that the image forming apparatus 101 has not been device registered. Actually, the connection support program 700 determines whether or not the device registration has been completed before the step of the processing in FIG. 9 begins, and if the device processing has been completed, omits the device registration processing (S901, and S902). For example, when the user presses the "start" button on the start screen 801 in FIG. 8, whether or not the device processing has been completed is determined. In addition, if the device processing has been completed, the display of the device registration key input screen 802 is skipped.

Figure 11:
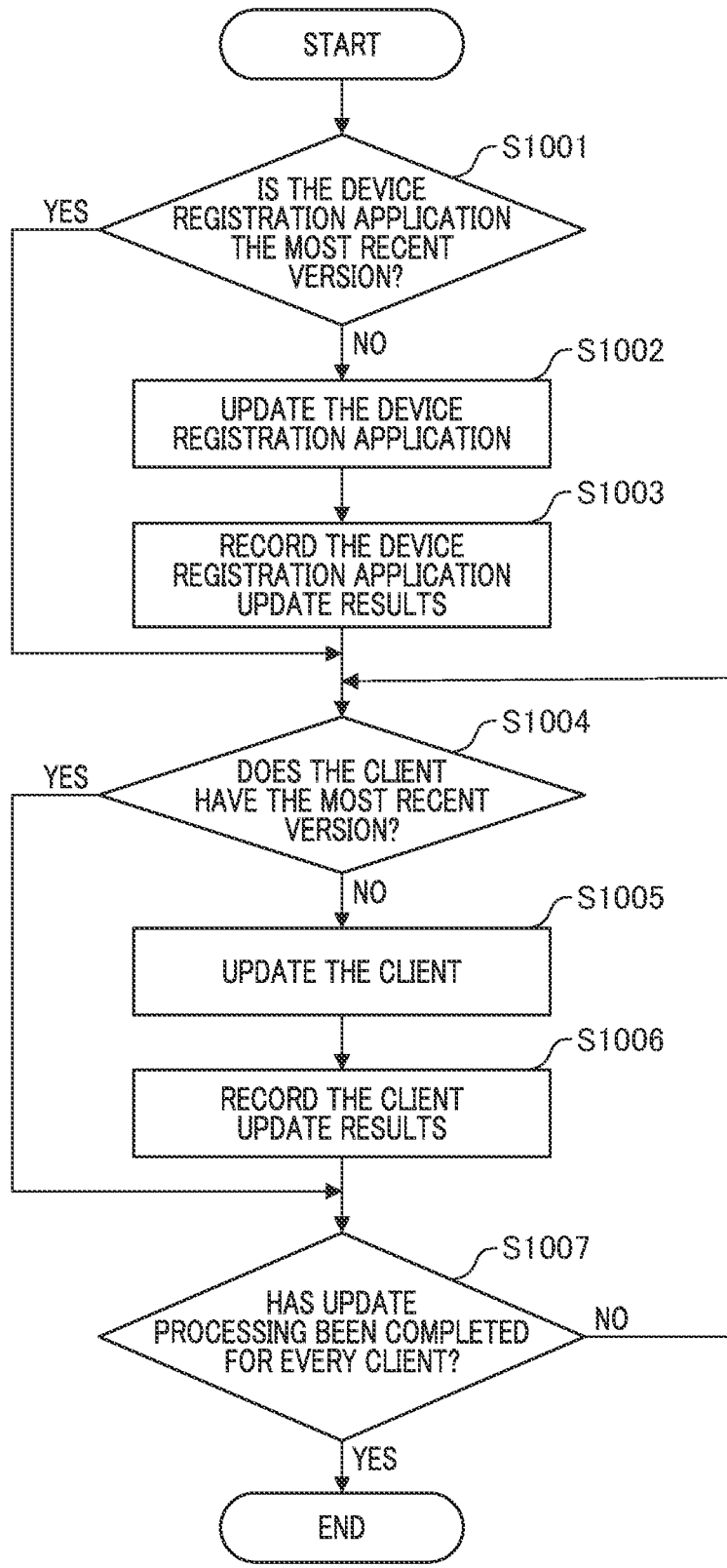
FIG. 11 is a diagram that shows an example of application update processing by the connection support program.

FIG. 11 is a flow chart that shows an example of application update processing by the connection support program 700. The processing in FIG. 11 is processing that is executed in the background when the cloud service connection processing that is shown in FIG. 9 is completed and the menu screen 807 is displayed.

In step S1001, the application installation section 704 determines whether or not the device registration application 409 that is currently installed is the most recent version. In the case that it is not the most recent version, the processing proceeds to S1002. In contrast, in the case in which it is the most recent version, the processing proceeds to S1004.

Specifically, the application installation section 704 is able to send a query to the application information management section 602 of the application management server 103 for a list of all of the versions of the device registration application 409 that are currently released on the market. The application installation section 704 specifies the most recent version from the version list that it has acquired. In addition, the application installation section 704 is able to send a query to the application management section 404 about the version of the device registration application 409 that has been installed. In addition, the application installation section 704 may perform the above determination by comparing the specified most recent version and the version that has been installed.

In Step S1002, the application installation section 704 updates the device registration application 409.

Specifically, the application installation section 704 downloads the application file and license file for the most recent version of the device registration application 409 from the application management server 103. In addition, the application installation section 704 overwrites and updates the device registration application 409 via the installer 407.

In step S1003, the results management section 712 records the overwritten and updated results for the application in a file. In addition, the results management section 712 manages the information for the application that the connection support program 700 overwrote and updated (the application ID, the application name, the version, the status, and the like).

The device registration application 409 is included in the firmware and is preinstalled. However, the development of the device registration application 409 will not necessarily occur at the same time as the development of the firmware. For example, it is possible that the device registration application 409 will be updated multiple times during a period of time in which the firmware is only upgraded once. Therefore, there is a possibility that after a certain amount of time has passed since the image forming apparatus 101 was shipped from the factory, a new version of the device registration application 409 will be made available on the market in the application management server 103. In this case, the device registration application 409 can be updated without affecting the time and user workload that are associated with the cloud service connection processing itself.

In addition, the update processing for the device registration application 409 will also be executed in the case in which the device registration processing in FIG. 9 (S901) has failed. For example, a case is assumed in which the device registration processing (S901) has failed due to the device registration application 409 that was pre-installed at the time of shipment from the factory being outdated. In this case, after the device registration application 409 has been updated, the connection support program 700 will be executed again, and if the device registration processing (S901) is restarted, the device registration will succeed. Therefore, confirmation of the application that needs to be updated and the version as well as the installation operation for the update can be finished without the user being aware of it, and therefore the workload of the user is decreased.

In step S1004, the application installation section 704 determines whether or not the client is the most recent version. The method for determining the most recent version is the same as S1001, and therefore a redundant explanation thereof will be omitted. In the case in which the client is not the most recent version, the processing proceeds to S1005. In contrast, in the case in which it is the most recent version, the processing proceeds to S1007.

In Step S1005, the application installation section 704 updates the client. Specifically, the application installation section 704 downloads the application file and the license file for the most recent version of the client from the application management server 103. In addition, the application installation section 704 overwrites and updates the client via the installer 407.

In Step S1006, the results management section 712 records the overwritten and updated results for the client in a file. Then the results management section 712 manages the client information that the connection support program 700 has overwritten and updated (the application ID, the application name, the version, the status, and the like).

In step S1007, the application installation section 704 determines whether or not all of the client update processing has been completed. In the case in which all of the client update processing has been completed, the processing in FIG. 11 ends. In contrast, in the case in which all of the client update processing has not been completed, the processing returns to S1004.

Specifically, in step S1007, whether or not update processing has been completed in all of the clients that have been stored in advance as targets for set up by the connection support program 700 and those that have been installed is determined. In other words, the clients that correspond to the services that are selectable on the service selection screen 803 or those that were already installed are the targets. Therefore, the target clients do not necessarily match those that were selected on the service selection screen 803. This kind of discrepancy can occur in cases in which, for example, a service was installed the last time that cloud service connection processing was performed, and during this cloud service connection operation a different service was selected. In addition, this kind of discrepancy can also occur in a case in which, by some kind of means, a client has already been installed.

In a case in which a certain amount of time has passed from when the client was installed until this cloud service connection processing is performed, there is a possibility that a new version of the client will have been made available on the market on the application management server 103. In this case, the preexisting client can be updated without affecting the time and user workload associated with the cloud service connection processing itself.

In this way, it is understood that in the processing in FIG. 11, the device registration application 409 and the preexisting client can be upgraded without affecting the time and user workload associated with the cloud service processing itself. Additionally, after the cloud service connection processing has been completed, the user will already be able to use each type of cloud service on the most recent version of the clients, thereby increasing the convenience for the user.

As was described above, the device registration processing of the present embodiment (S901 and S902) is executed by the device registration application 409 that has been preinstalled. The setup of the client A410 and the client B411 is executed concurrent to the above-described device registration processing (S903 to S912). In addition, after this processing has been completed, a communication test is executed by the communication test control section 706 and the communication test section 710 (S914). In this way, in the present embodiment, by executing the processing for each application in parallel, the time associated with the cloud service connection processing can be reduced in comparison to a case in which these processes are serially executed in order.

In addition, in the above-described embodiment, the processing for each application is executed after having input all of the device key, the settings information corresponding to the cloud services to be used, and the like. Therefore, the user labor that occurs in the cloud service connection processing is reduced, and its convenience is improved.

In addition, in the present embodiment, even in the case in which the device registration has failed, the client installation processing is executed concurrently. Therefore, in the case in which the connection support program is executed again, the client installation processing can be omitted (Yes in S903), and the recovery operation time can be decreased.

In addition, in the present embodiment, after the cloud service connection processing has been completed, the updates for each application are executed in the background. Therefore, the time for the cloud service connection processing is reduced while making it possible to use the most recent version of the clients corresponding to each type of service.

Other Embodiments

The embodiment that has been described above explains an example of a support system in which the image forming apparatus 101 is the target. However, the information processing apparatus that is supported by the support system in the present invention is not limited to an image forming apparatus, and may be any network device that can use a cloud service.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing section (CPU), micro processing section (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-022922, filed Feb. 16, 2021 which is hereby incorporated by reference herein in its entirety.

What is claimed is:

1. An information processing apparatus configured so as to execute a first application and a second application, comprising:
    a memory storing instructions; and
    a processor executing instructions causing the information processing apparatus to:
        receive the selection of a service to be used, and the settings related to the second application corresponding to the service that has been selected;
        control the execution of processing including the installation of the second application and the application of the received settings in parallel with device registration processing, without waiting to record the results of the device registration processing for the information processing apparatus by the first application; and
        execute a communication test in the case in which the results of the device registration processing is successful, wherein
    in the control, after the processing until the execution of the communication test has been completed, while displaying a menu screen on a display apparatus to display the results of the process, the updates for the first application and second application are executed in the background.

2. The information processing apparatus according to claim 1, wherein
    the first application is a portion of the firmware programs that are provided by being incorporated into the information processing apparatus, and
    the second application is a client program that is installed in order for the information processing apparatus to be provided with a cloud service.

3. The information processing apparatus according to claim 2, wherein
    in the execution, in the case in which the results of the device registration processing is successful, a communication test for the cloud service is executed.

4. The information processing apparatus according to claim 1, wherein
    in the control, even if the device registration processing by the first application fails, the updates are still executed.

5. The information processing apparatus according to claim 1, wherein
    in the control, in the case in which the second application has been installed, the processing for applying the received settings is executed without performing the installation of the second application.

6. The information processing apparatus according to claim 1, wherein
    in the control, in the case in which there is a plurality of second applications corresponding to the services that were selected, each of the processing including the installation of the second application and the application of the received settings are executed in parallel.

7. A method comprising:
    receiving the selection of a service to be used and the settings related to a second application corresponding to the service that has been selected;
    controlling the execution of processing including the installation of the second application and the application of the received settings in parallel with device registration processing, without waiting to record the results of the device registration processing for an information processing apparatus by a first application; and
    executing a communication test in the case in which the results of the device registration processing is successful, wherein
    in the controlling, after the processing until the executing of the communication test has been completed, while displaying a menu screen on a display apparatus to display the results of the process, the updates for the first application and second application are executed in the background.

8. A non-transitory storage medium on which is stored a computer program for making a computer of an information processing apparatus execute:
    receiving the selection of a service to be used and the settings related to the second application corresponding to the service that has been selected;
    controlling the execution of processing including the installation of the second application and the application of the received settings in parallel with device registration processing, without waiting to record the results of the device registration processing for an information processing apparatus by a first application; and
    executing a communication test in the case in which the results of the device registration processing is successful, wherein
    in the controlling, after the processing until the executing of the communication test has been completed, while displaying a menu screen on a display apparatus to display the results of the process, the updates for the first application and second application are executed in the background.

* * * * *